(No Model.)
S. BROWN.
SAFETY CAR TRUCK.
No. 297,061. Patented Apr. 15, 1884.
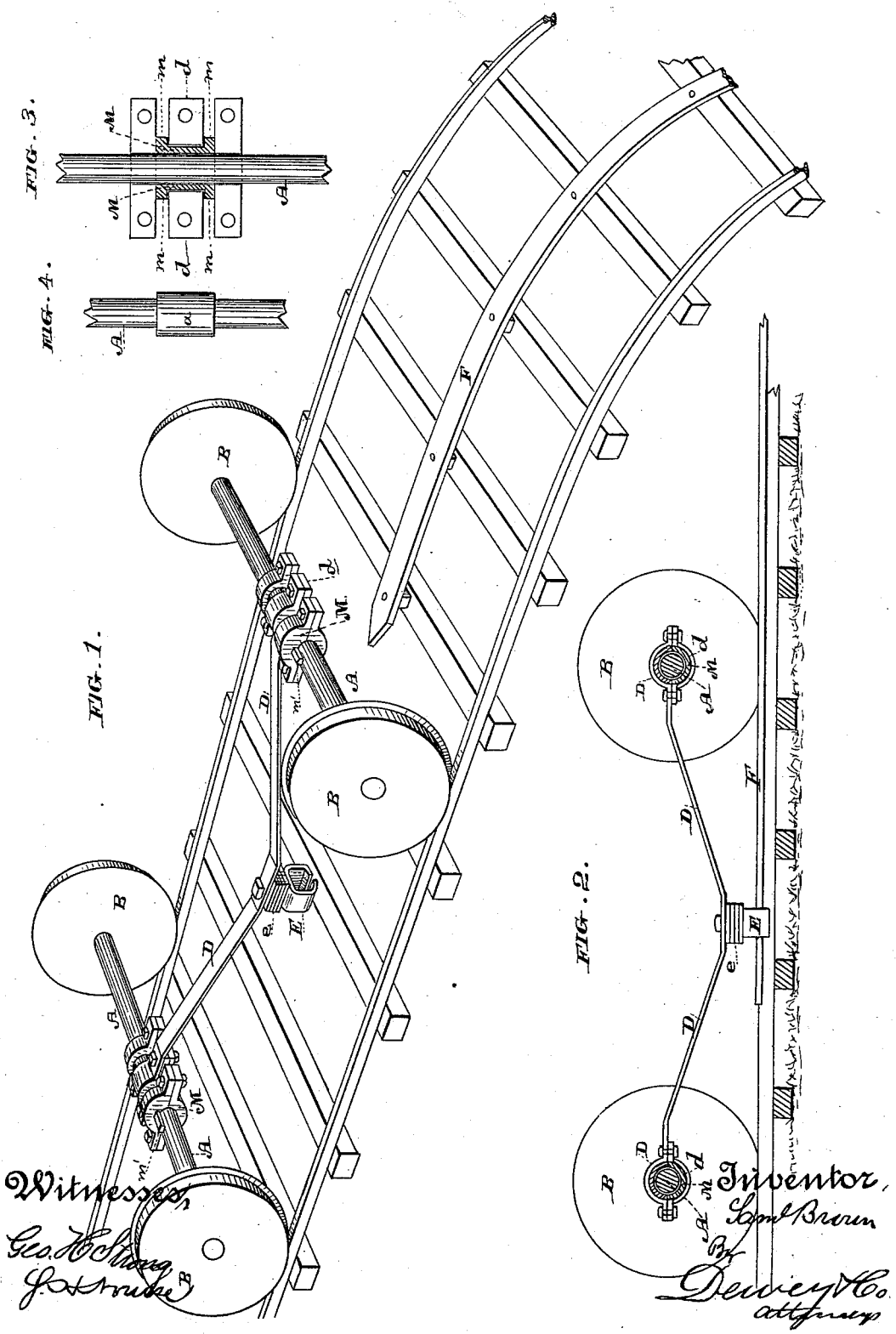

UNITED STATES PATENT OFFICE.

SAMUEL BROWN, OF SAN FRANCISCO, CALIFORNIA.

SAFETY CAR-TRUCK.

SPECIFICATION forming part of Letters Patent No. 297,061, dated April 15, 1884.

Application filed December 28, 1883. (No model.)

*To all whom it may concern:*

Be it known that I, SAMUEL BROWN, of the city and county of San Francisco, and State of California, have invented an Improvement in Safety Car-Trucks; and I hereby declare the following to be a full, clear, and exact description thereof.

My invention relates to the class of safety car-trucks in which a suitable guard on the truck engaging with a rail in the road-bed prevents the car from jumping the track, and to a new and useful improvement upon that certain device of this class secured to me by Letters Patent of the United States No. 280,442, dated July 3, 1883.

This improvement consists in the means by which the safety clamp or guard is connected with the truck, the construction and arrangement of parts being hereinafter fully described.

Referring to the accompanying drawings, Figure 1 is a perspective view of my invention. Fig. 2 is a longitudinal section. Fig. 3 is a horizontal section of sleeve M, bearing on end of bar D. Fig. 4 shows enlarged center formed on axle.

The object of my invention is to attach the clamp or guard to the truck in the simplest, strongest, and most direct manner.

A are the axles, and B the wheels, of a railway-truck. E is the safety clamp or guard, and F the raised bar or rail in the center of the track, with which said clamp or guard is adapted to engage on curves and other dangerous places in the road, as I have fully explained in my patent above referred to. In that patent the clamp or guard was secured to cross-bars supported by the equalizer-bars; but herein I propose to attach it more directly to the axles. This is done by a bar, D, the ends of which are clamped round the center of the axles, and form bearings or boxes in which the axles turn. These bearings are formed as follows: The ends of bar D are formed into one-half the bearing, which encircles the upper semi-circumference of the axles, and a similar half encircles the lower semi-circumference as a cap, *d*, which is bolted to the upper bearing, Fig. 2; but some preparation of the axles is required for this connection. The axles now in use are probably too weak at the center, and therefore in all new axles I would enlarge the center *a*, as shown in Fig. 4, to have the requisite degree of strength; but to make the connections with those already in use, I clamp upon their centers an elongated sleeve, M, formed in halves, with suitable lugs for bolting them together, Fig. 3. These are further secured upon the axle by a key, *m'*, the seat of which is made in the sleeve itself, and not in the axle, so that the latter is not weakened, Fig. 1. This sleeve is of suitable thickness to give strength to the axle. It has shoulders *m* turned near each end, and the boxes or bearings at the ends of bar D fit around the sleeve between its shoulders, Fig. 3. There is no danger of the journals thus formed getting hot, as they support no weight but the bar and clamp. Between the clamp or guard and bar are a number of thin plates, *e*. These are to provide for the readjustment of the clamp when, by reason of the wear and tear of the rails and wheel, it is lowered too much to properly engage with the raised bar F. Then the bolts securing it to the bar D are taken out and one or more of said plates are removed, and the clamp again secured in proper place.

Having thus described my invention, what I claim as new, and desire to secure by Letters Patent, is—

1. In a safety car-truck, and in combination with the axles, the bar D, having boxes formed on each end, in which the axles are journaled, and the clamp or guard E, secured to said bar, substantially as herein described.

2. In a safety car-truck, and in combination with the axles, the bar D, the ends of which are formed to encircle the upper semi-circumference of the axles, the caps *d*, formed to encircle the lower semi-circumference, and bolted to the ends of the bar, whereby boxes are formed in which the axles are journaled, and the clamp or guard E, secured to said bar, substantially as herein described.

3. In a safety car-truck, the bar D, extending between the axles, which are journaled in its ends, as described, in combination with the clamp or guard E, bolted to said bar, and the intervening thin plates, *e*, between said bar and clamp, whereby the latter may be vertically adjusted, substantially as herein described.

4. In a safety car-truck, the axles A and the sleeves M, clamped and secured thereto, and formed, as shown, with shoulders $m$, in combination with the bar D, the ends of which form boxes or journals encircling the sleeves M of the axles, and the clamp or guard E, secured to said bar, substantially as herein described.

In witness whereof I have hereunto set my hand.

SAMUEL BROWN.

Witnesses:
C. D. COLE,
J. H. BLOOD.